United States Patent [19]
Soudelier

[11] 3,812,722
[45] May 28, 1974

[54] FLUID SAMPLING DEVICE

[75] Inventor: Morris A. Soudelier, Houma, La.

[73] Assignee: Houma Valve Service, Inc., Houma, La.

[22] Filed: June 21, 1972

[21] Appl. No.: 264,828

[52] U.S. Cl. .......................................... 73/422 TC
[51] Int. Cl. ............................................ G01n 1/10
[58] Field of Search .................. 73/422 TC, 422 R

[56] References Cited
UNITED STATES PATENTS

| | | | |
|---|---|---|---|
| 2,994,224 | 9/1958 | Brown | 73/421 B X |
| 3,101,619 | 8/1963 | Hunter | 73/422 TC |
| 3,260,120 | 7/1966 | Stillwell | 73/422 R |
| 3,276,263 | 10/1966 | Keeney, Jr. | 73/422 TC |

Primary Examiner—Richard C. Queisser
Assistant Examiner—Daniel M. Yasich
Attorney, Agent, or Firm—Clarence A. O'Brien; Harvey B. Jacobson

[57] ABSTRACT

Fluid flowing through a conduit is sampled by repeated expansion of a pressure chamber in an elongated tubular housing projecting into the flow conduit through a sampling outlet to which the housing is releasably clamped. The pressure chamber is formed between an inlet check valve and a reciprocating piston mounted on a discharge check valve through which fluid is transferred to a passage in the piston plunger during contraction of the pressure chamber. A relief valve carried by the plunger opens in response to a predetermined pressure of the fluid in the plunger passage, to supply a sample of the fluid.

6 Claims, 4 Drawing Figures

PATENTED MAY 28 1974 3,812,722

FLUID SAMPLING DEVICE

This invention relates to a new and useful device for sampling fluid in a flow conduit by withdrawal of a predetermined quantity of the fluid.

Devices for withdrawing samples of fluid from a flow conduit by use of a powered reciprocating valve arrangement, are well known as disclosed for example in U. S. Pat. No. 3,101,619 to Hunter. Such prior fluid sampling devices required, however, a special flow conduit configuration and involved a sliding valve that would rapidly become operationally unreliable and unrepairable because of wear produced by foreign matter entrained in the flow stream. It is therefore an important object of the present invention to provide a fluid sampling device which is more versatile in installation, adjustable in use and less likely to malfunction due to wear of parts.

In accordance with the present invention, a fluid flow conduit is provided with a sampling port in communication with an outlet tube extending transversely to the flow conduit and having a releasable clamp device connected thereto for clamping an elongated probe housing therewithin. Thus, the probe housing may be operatively positioned so that its forward end, which mounts an inlet check valve, will be disposed within the flow conduit and admit fluid under a static pressure in a direction transverse to the direction of flow. Fluid is admitted in response to a pressure differential caused by expansion of a pressure chamber formed within the probe housing between the inlet check valve and a piston connected to the end of a tubular plunger, by a second check valve through which fluid is transferred from the pressure chamber during contraction thereof into a passage formed in the piston plunger. The piston plunger is reciprocated by a powered drive assembly and carries a relief valve through which fluid stored in the piston plunger passage is discharged when its pressure exceeds a predetermined value above that of the fluid in the flow conduit. Thus, after the piston is reciprocated a predetermined number of strikes, a sample of fluid will be discharged from the relief valve into a receiving receptacle.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
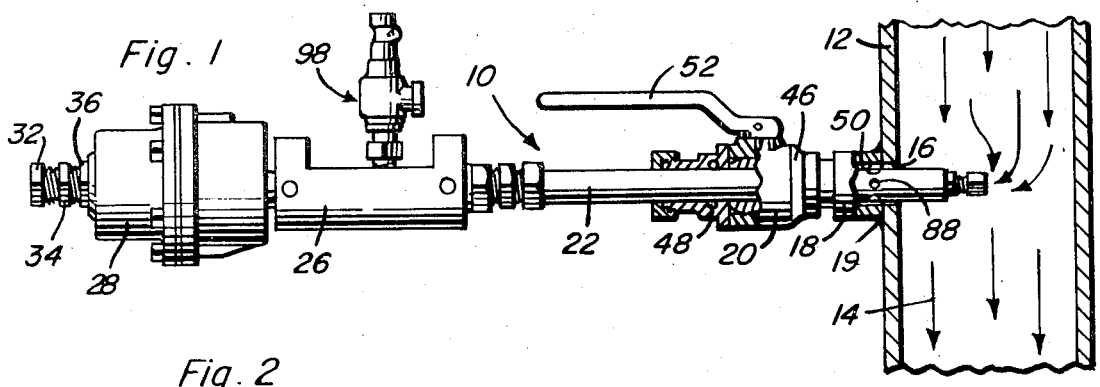
FIG. 1 is a side elevational view of the sampling device of the present invention with associated installational components shown in section.

Referring now to the drawings in detail, FIG. 1 illustrates the fluid sampling device of the present invention generally referred to by reference numeral 10 installed in a flow conduit 12 through which a fluid flow steam is conducted as indicated by the arrows 14. The sampling device 10 extends into the flow conduit transverse to the flow stream through a sampling port 16. A sampling outlet tube 18 is secured to the flow conduit in alignment with the port 16 by means of a weld 19. A clamping mechanism generally referred to by reference numeral 20 is threadedly connected to the outlet tube 18 in order to releasably hold the sampling device 10 in an operative position as shown.

The sampling device 10 includes an elongated probe housing 22 of tubular configuration that is connected to a carrier frame 26 at one end through which the probe housing is secured to the housing of a reciprocating drive assembly 28. The frame 26 slidably supports a reciprocating, tubular plunger 30 connected to the drive assembly. The drive assembly may be of any suitable type well known to those skilled in the art by means of which reciprocating movement is imparted to the plunger 30. In the embodiment illustrated, the drive assembly 28 includes a travel adjuster 32 on which a locknut 34 is threadedly mounted for locking the adjuster in an adjusted position by abutment with the adapter 36. The distance travelled by the plunger 30 during each stroke may thereby be set in order to control the amount of expansion of a pressure chamber 38 formed between an inlet check valve assembly 40 and a piston assembly 42. The piston assembly is mounted on a discharge check valve assembly 44 to which the forward end of the plunger 30 is threadedly connected as shown in FIGS. 2 and 3.

As shown in FIG. 1, the clamp device 30 includes a compression fitting 46 which is threadedly connected to the outlet tube 18 and includes an O-ring wiping seal 48 blocking flow of fluid from the leakage passage 50 formed about the tubular housing 22 within the fitting 46 and the outlet tube 18. The fitting 46 mounts any suitable clamping device, the details of which form no part of the present invention. The clamping device is operative to releasably hold the tubular housing 22 in its axial position as shown. A locking handle 52 is thus associated with the clamping device in order to releasably clamp the tubular housing in place.

Figure 2:
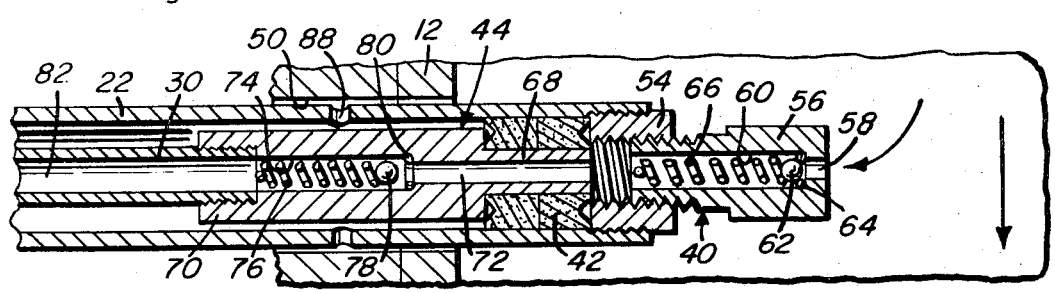
FIG. 2 is a partial longitudinal sectional view of the forward portion of the sampling device.
Figure 3:
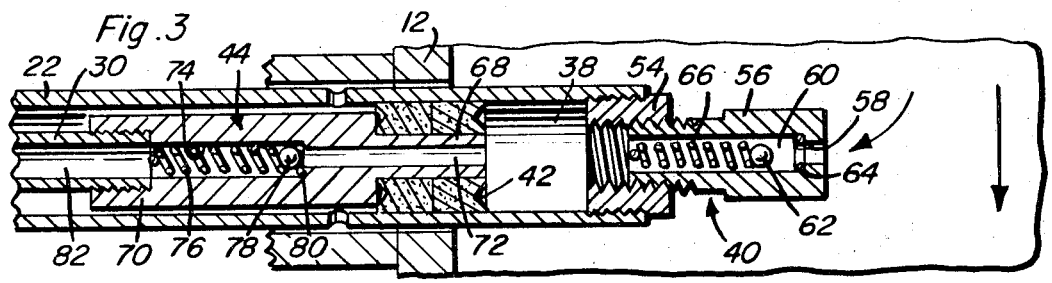
FIG. 3 is a partial longitudinal sectional view showing the sampling device in another operational phase.

The inlet check valve assembly 40 as shown in FIGS. 2 and 3, is positioned within the flow conduit and projects from the forward end of the tubular housing to which it is connected by means of an inlet closure element 54. The check valve assembly includes a valve body 56 having an inlet port 58 at the forward end through which fluid enters the passage 60 adapted to be closed by a ball valve element 62 when seated on the valve seat 64 under the bias of a spring 66. The passage 60 opens into the pressure chamber 38. Accordingly, in response to expansion of the chamber 38 as shown in FIG. 3, the check valve 40 will open as shown in order to admit fluid. It will be apparent to anyone skilled in the art that check valve 40 opens between the valve element 62 is unseated by a pressure differential between the fluid passage in conduit 12 and the suction pressure produced by expansion of chamber 38, overcoming the closing bias of spring 66.

Expansion and contraction of the pressure chamber 38 is effected by means of the piston assembly 42 which includes a pair of annular seal membeers externally mounted on a tubular stem 68 projecting forwardly from the valve body 70 associated with the discharge check valve assembly 44. A passage 72 extends through the stem 68 into a larger diameter passage 74 within which a valve closing spring 76 is retained for biasing a ball valve element 78 to a position blocking inflow when abutting the valve seat 80. It will therefore be apparent that during contraction of the pressure chamber 38, the inlet check valve assembly 40 will close to trap fluid therein causing a rise in its pressure and opening of the discharge check valve assembly 44. Fluid will accordingly be transferred from the pressure chamber into a fluid storing passage 82 formed within the piston plunger 30 to which the valve body 70 is threadedly connected.

Figure 4:
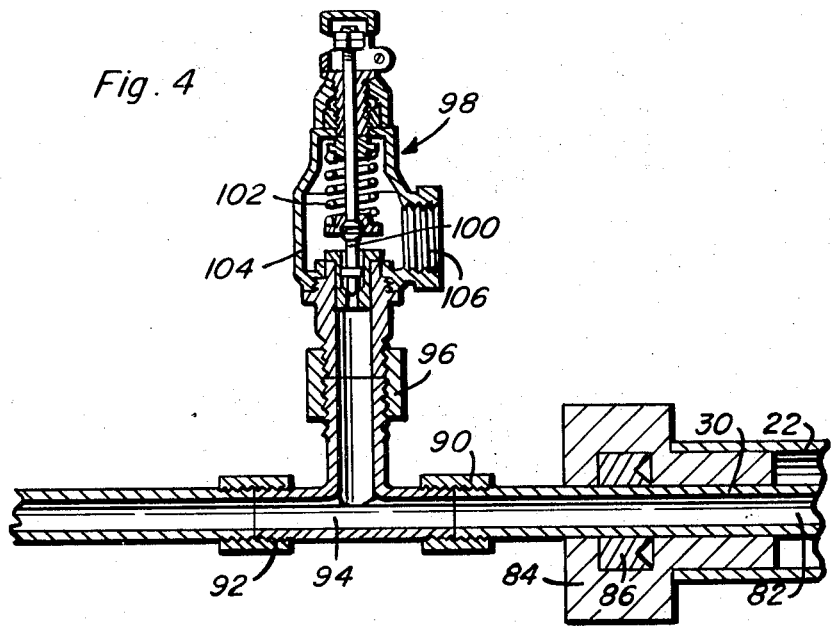
FIG. 4 is a partial sectional view of a rear portion of the sampling device.

As shown in FIG. 4, the end of the tubular housing 22 externally of the flow conduit is closed by a closure member 84 within which a wiping seal 86 is mounted. The closure member 84 accordingly slidingly supports the reciprocating plunger 30 as well as to close the external end of the tubular housing. Any leakage fluid that escapes from the pressure chamber into the tubular housing will be drained through a vent port 88 formed in the tubular housing at the discharge valve assembly location as shown in FIGS. 2 and 3.

The plunger 30 is connected by a coupling 90 and connector 92 to the reciprocating drive assembly 28 as shown in FIG. 4. An elbow section 94 extends from the coupling 90 and is threadedly connected by the coupling 96 to a relief valve assembly 98 having a valve element 100 normally held in a closed position under the bias of a spring 102. The valve assembly 98 includes a valve body 104 having an outlet 106 through which a sample of fluid is discharged into a receptacle (not shown). Discharge of a fluid sample to atmosphere through the outlet 106 may be affected when the pressure of the fluid within the passage 82 rises to a predetermined value set by adjustment of the bias of spring 102. This pressure will exceed that of the static pressure of the fluid within the flow conduit. The check valve 44 also opens at a higher pressure than that of the static pressure of the fluid in the flow conduit.

The fluid sampling device 10 may be inserted into a flow conduit or removed therefrom without any loss of line fluid. The tubular housing 22 of the sampling device may be adjustably positioned in order to accommodate any installation and clamped in place as aforementioned so that the inlet check valve assembly 40 will be positioned properly within the flow stream. When the drive assembly 28 is activated, the pressure chamber 38 will be cyclically expanded and contracted to thereby intake a quantity of fluid during the expansion phase of each cycle, this quantity of fluid then being transferred to the passage 82 within the plunger 30 during the contraction phase of the cycle by opening of the discharge check valve 44. Thus, the pressure within the transfer passage 82 of the plunger increases until it exceeds the closing bias of the relief valve 98 at which point a sample of fluid is discharged to atmosphere.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a fluid flow conduit and a sampling outlet extending therefrom transversely of the flow of fluid, a sampling mechanism comprising an elongated tubular housing extending into the flow conduit through said sampling outlet, releasable clamp means connected to the sampling outlet for locking the housing in a sampling position, a pair of closure devices mounted at opposite end portions of the housing internally and externally of the flow conduit, a reciprocating plunger slidably mounted in one of said closure devices externally of the flow conduit, said plunger having a transfer passage extending therethrough between opposite ends of the plunger, biased discharge valve means connected to the plunger within the housing for conducting fluid under pressure in one direction only into the transfer passage, a piston assembly connected to the discharge valve means and forming a variable volume pressure chamber within the housing adjacent to the other of the closure devices, biased inlet valve means projecting from said other of the closure devices within the flow conduit for conducting fluid under pressure in one direction only into the pressure chamber upon expansion of the pressure chamber, reciprocating drive means connected to the plunger for reciprocation of the piston assembly causing expansion and contraction of the pressure chamber to alternately intake a sample of the fluid through the inlet valve means upon expansion of the pressure chamber and pressurize said sample and to cause fluid to flow into the discharge valve means upon contraction thereof, a relief valve assembly having a closing bias exceeding the static pressure of the fluid in the flow conduit, and coupling means connecting the pressure relief valve assembly to the plunger externally of the housing for periodically discharging fluid from the transfer passage when the pressure thereof builds up to a predetermined value exceeding said static pressure of the fluid in the flow conduit.

2. The combination of claim 1 wherein said discharge valve means includes an elongated valve body forming a leakage flow passage within the housing on one axial side of the piston assembly opposite the pressure chamber, said housing being formed with a vent port in communication with the leakage passage within the sampling outlet.

3. The combination of claim 2 including a tubular stem projecting from the valve body of the discharge valve means on which the piston assembly is mounted.

4. The combination of claim 3 wherein said discharge and inlet valve means include spring-biased, check valve elements respectively unseated during contraction and expansion of the pressure chamber.

5. The combination of claim 1 wherein said discharge and inlet valve means include spring-biased, check valve elements respectively unseated during contraction and expansion of the pressure chamber.

6. The combination of claim 1 including a tubular stem projecting from the discharge valve means on which the piston assembly is mounted.

* * * * *